(12) United States Patent
Andrade et al.

(10) Patent No.: US 8,943,482 B2
(45) Date of Patent: Jan. 27, 2015

(54) INCREMENTALLY CONSTRUCTING EXECUTABLE CODE FOR COMPONENT-BASED APPLICATIONS

(75) Inventors: Henrique Andrade, Croton-on-Hudson, NY (US); Bugra Gedik, White Plains, NY (US); Rui Hou, Beijing (CN); Hua Yong Wang, Beijing (CN); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 12/467,011

(22) Filed: May 15, 2009

(65) Prior Publication Data

US 2010/0293533 A1    Nov. 18, 2010

(51) Int. Cl.
 G06F 9/45 (2006.01)
 G06F 9/44 (2006.01)
 G06F 9/445 (2006.01)
(52) U.S. Cl.
 CPC ... G06F 8/71 (2013.01); *G06F 8/60* (2013.01); *G06F 8/70* (2013.01); G06F 8/10 (2013.01); G06F 8/30 (2013.01)
 USPC ............................. 717/140; 717/154; 717/156
(58) Field of Classification Search
 CPC ............... G06F 8/71; G06F 8/30; G06F 8/10
 USPC ......................................... 717/140, 154, 156
 See application file for complete search history.

(56) References Cited

U.S. PATENT DOCUMENTS 7,437,717 B1   10/2008   Cowan 7,836,440 B2   11/2010   Blackman
(Continued)

FOREIGN PATENT DOCUMENTS

CN        1808378 A      7/2006
CN     101568927 A     10/2009
(Continued)

OTHER PUBLICATIONS

"Wu et al ";"Challenges and Experience in Prototyping a Multi-Modal Stream Analytic and Monitoring Application on System S";"Sep. 23-28, 2007";"12 pages".*
(Continued)

*Primary Examiner* — Wei Zhen
*Assistant Examiner* — Brahim Bourzik
(74) *Attorney, Agent, or Firm* — Jeff Tang (57) ABSTRACT

One embodiment of a method for constructing executable code for a component-based application includes receiving a request to compile source code for the component-based application, wherein the request identifies the source code, and wherein the source code comprises a plurality of source code components, each of the source code components implementing a different component of the application, and performing a series of steps for each source code component where the series of steps includes: deriving a signature for the source code component, retrieving a stored signature corresponding to a currently available instance of executable code for the source code component, comparing the derived signature with the stored signature, compiling the source code component into the executable code when the derived signature does not match the stored signature, and obtaining the executable code for the source code component from a repository when the derived signature matches the stored signature.

18 Claims, 5 Drawing Sheets

(56) References Cited

U.S. PATENT DOCUMENTS

| | | | |
|---|---|---|---|
| 2004/0049766 A1* | 3/2004 | Bloch et al. | 717/121 |
| 2004/0172618 A1* | 9/2004 | Marvin | 717/116 |
| 2007/0209031 A1* | 9/2007 | Ortal et al. | 717/104 |
| 2008/0046868 A1* | 2/2008 | Tsantilis | 717/136 |
| 2009/0055809 A1* | 2/2009 | Campbell | 717/140 |

FOREIGN PATENT DOCUMENTS

| | | |
|---|---|---|
| JP | 10-222358 | 8/1998 |
| JP | 2002082811 | 3/2002 |
| JP | 2004078751 | 3/2004 |
| JP | 2005129028 | 5/2005 |
| JP | 2005-243004 | 9/2005 |

OTHER PUBLICATIONS

"Doo et al";"SPADE: The System S Declarative Stream Processing Engine";"Jun. 9-12, 2008";"12 pages".*

Kazu Yasuda et al., "Reducing Recompilation Time for C-based Object-oriented Languages," IPSJ SIG Technical Reports, Information Processing Society of Japan, vol. 91, No. 32. Apr. 26, 1991.

Burga Gedik et al., "SPADE: The System S Declarative Stream Processing Engine," SIGMOD'08 Proceedings of the 2008 ACM SIGMOD international conference on Management of Data, pp. 1123-1134, Jun. 12, 2008.

* cited by examiner

INCREMENTALLY CONSTRUCTING EXECUTABLE CODE FOR COMPONENT-BASED APPLICATIONS

REFERENCE TO GOVERNMENT FUNDING

This invention was made with Government support under Contract No. H98230-07-C-0383, awarded by the United States Department of Defense. The Government has certain rights in this invention.

BACKGROUND OF THE INVENTION

The present invention relates generally to component-based code generation, and relates more specifically to an incremental method for constructing component-based applications.

Component-based applications are applications that are built using a plurality of interconnected functional components or operators. Within this context, a component is a small piece of code that carries out generic operations, such as data transformations, filtering, annotation, classification, de-multiplexing, and splitting. Two components can interact through streams, which carry a potentially infinite quantity of data. The components operate on this data in a predefined manner, possibly according to a specified sequence, to produce some output.

Typically, each of these components is built in accordance with a two-step process that involves code generation and code compilation. The code generation step consists of generating executable code from the declarative description of the application. Specifically, given a component of a specific class, code generation involves invoking the code generator corresponding to that class and providing it with the proper configuration parameters for the component. The code generator then generates specialized code in a general purpose programming language (e.g., the C or C++ programming language) for the component. The code compilation step consists of compiling the specialized code into object code that is executable on the target platform (e.g., an Intel x86 instruction set architecture-based computer). General purpose build tools are typically used to orchestrate the generation and/or compilation steps. Some examples of such build tools are the "make," "gnumake," "nmake," "jam," and "ant" tools.

In some cases, a file that contains the declarative description of a component-based application may change. As a result, some of the components associated with the application may change, necessitating the re-generation of the code for those components. Conventional build tools that rely on timestamp data to determine if code has changed not only re-generate the code for all of the components, but also completely re-compile the re-generated code. Thus, code is re-generated and re-compiled even for components that have not effectively changed (e.g., have not changed the way in which they process data), simply because their timestamps are newer than the object code's.

SUMMARY OF THE INVENTION

One embodiment of a method for constructing executable code for a component-based application includes receiving a request to compile source code for the component-based application, wherein the request identifies the source code, and wherein the source code comprises a plurality of source code components, each of the source code components implementing a different component of the application, and performing a series of steps for each source code component where the series of steps includes: deriving a signature for the source code component, retrieving a stored signature corresponding to a currently available instance of executable code for the source code component, comparing the derived signature with the stored signature, compiling the source code component into the executable code when the derived signature does not match the stored signature, and obtaining the executable code for the source code component from a repository when the derived signature matches the stored signature.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for incrementally constructing component-based applications. Embodiments of the present invention employ a metadata-based signature technique to avoid unnecessarily re-generating and re-compiling executable component code. In particular, metadata is used to describe the configurations that define each component of an application. A signature is computed from this metadata for each component and maintained in association with the executable code generated for the component in a code repository. At code generation time, the code repository is searched, and, if stored code is found therein that corresponds to the component for which new code is to be generated, the signature corresponding to the stored code is retrieved. If the signature of the stored code differs from a computed signature for the new code, the code for the component is re-generated in accordance with the new code. If the signatures do not differ, the code for the component is not re-generated.

Figure 1:
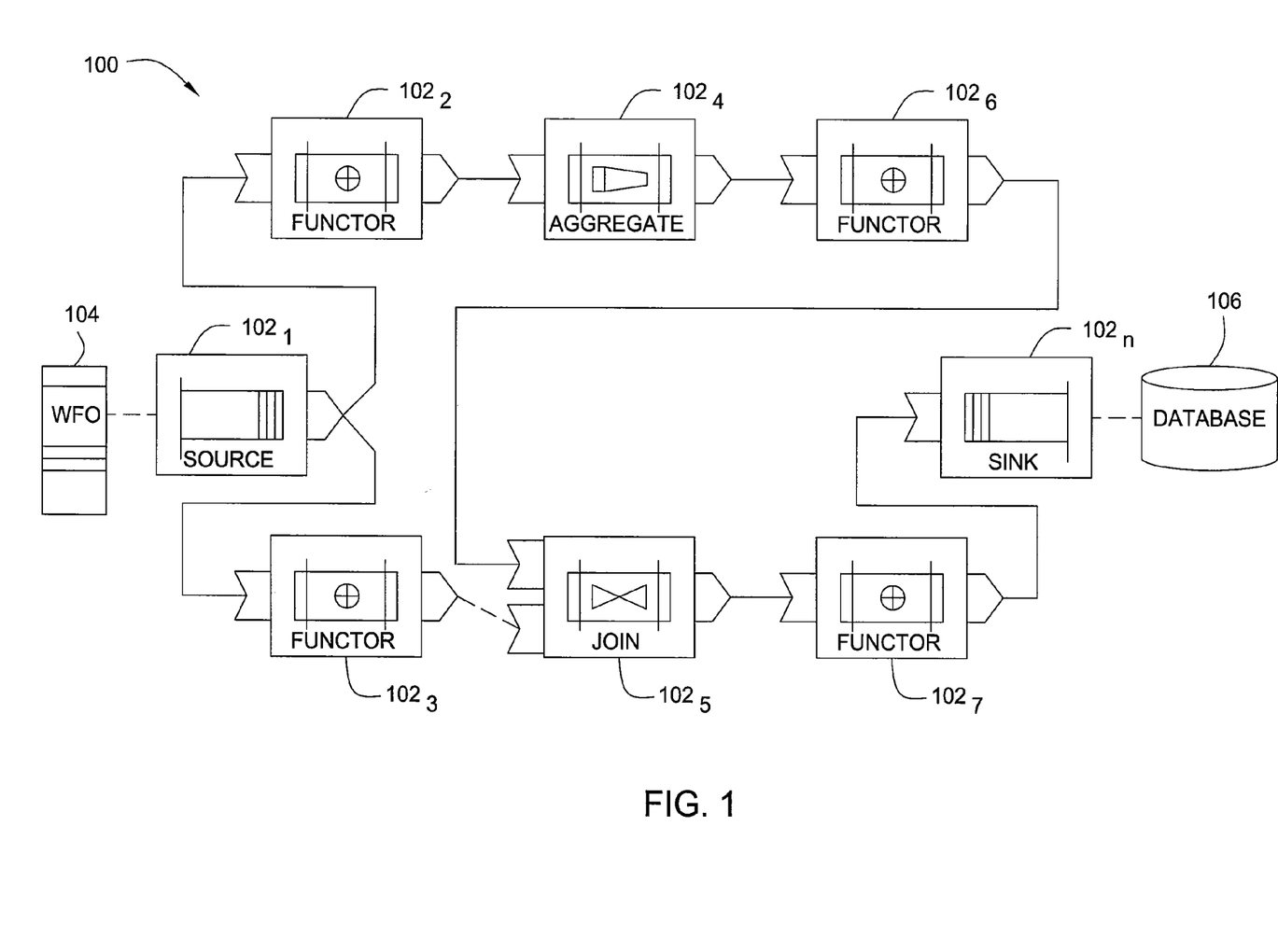
FIG. 1 is a block diagram illustrating a first exemplary component-based application that may be adapted to benefit from the present invention.

FIG. 1 is a block diagram illustrating a first exemplary component-based application 100 that may be adapted to benefit from the present invention. In particular, the exemplary component-based application 100 is a stream processing application; however, it is understood that the present invention may be used in substantially any type of component-based application development framework and is not limited to stream processing applications.

The application 100 comprises a plurality of components or "operators" $102_1$-$102_n$ (hereinafter collectively referred to as "operators 102") that are connected to each other by streams. The operators 102 are configured to operate on incoming streaming data 104 and to output a result of the operation (possibly also in stream form) to a database 106.

In one embodiment, each of the operators 102 is one of a plurality of possible types, including, but not limited to: Source (e.g., operator $102_1$, which is used to read data from external data sources), Functor (e.g., operators $102_2$, $102_3$, $102_6$, and $102_7$, which is used to carry out basic data transformations, such as filtering, on streaming data), Aggregate (e.g., operator $102_4$, which is used to logically group streaming data into summaries), Join (e.g., operator $102_5$, which is used to correlate two streams), and Sink (e.g., operator $102_n$, which is used to externalize data). Each of these operators 102 can be configured in a specific way. In other words, each operator 102 is a configurable component with a specific type. Thus, each operator 102 may be referred to as an "operator instance" within the context of the exemplary stream processing application 100.

For instance, the exemplary application 100 may be configured to process a stream of financial data, such as a live stock market feed. In such an application, the Source operator $102_1$ may read input from the incoming data stream 104 and passes this input on to first and second Functor operators $102_2$ and $102_3$. The first Functor operator $102_2$ might pass trades and compute volume prices from the input data stream, while the second Functor operator $102_3$ might pass stock quotes from the incoming data stream. The trades and volume prices are then passed from the first Functor operator $102_2$ to the Aggregate operator $102_4$, which might compute a moving average for each stock ticker or symbol in the incoming data stream. The Aggregate operator $102_4$ might then pass the moving average to a third Functor operator $102_6$, which computes the volume-weighted average price (VWAP) of stocks in the incoming data stream. The Join operator $102_5$ might receive the stock quotes from the second Functor operator $102_3$ and the volume-weighted average price from the third Functor operator $102_6$ and compute a bargain index. The Join operator $102_5$ might then pass the bargain index to a fourth Functor operator $102_7$, which might drop the messages with a zero-value bargain index before passing the data to the Sink operator $102_n$, which then writes the results to the database 106.

As discussed above, compiling a stream processing application such as the exemplary application 100 involves generating executable code from the logical description of the application. Given an operator instance of a specific type, code generation involves invoking the corresponding code generator and providing the code generator with the proper configuration parameters. The code generator generates specialized code in a general purpose programming language (e.g., the C or C++ programming language) for the operator instance. The generated code is then compiled into object code that is executable on the target platform. Compilation is generally performed using general purpose build tools, such as the "make" tool.

For instance, consider the following two exemplary Functor operator instances, represented in a high-level programming language, where two Functor operators are used to generate new streams (TradeFilter and QuoteFilter) by processing the data coming from a primal stream called TradeQuote). These examples, and those shown below, are written in the SPADE programming language, which is described in further detail by Gedik et al. in "SPADE: The System S Declarative Stream Processing Engine," SIGMOD Conference 2008: 1123-1134.

Stream TradeFilter(ticker: String, myvwap:Float, volume:Float)
  := Functor(TradeQuote) [ttype="Trade" & volume>0.0]    (EX. 1)
    {myvwap :=price*volume}
Stream QuoteFilter(ticker:String, askprice:Float, asksize:Float)    (EX. 2)
  := Functor(TradeQuote) [ttype="Quote" & askprice>0.0] { }

EX. 1 and EX. 2 represent high-level programming language translations of the declarative descriptions for the corresponding Functor operator instances.

The two Functor operator instances in EX. 1 and EX. 2 are clearly configured in different ways. Specifically, the schemas of the streams that each of the operator instances are generating are different (i.e., the schema for TradeFilter versus the schema for QuoteFilter). In addition, some of the parameters, such as the filtering conditions (i.e., ttype="Trade"& volume>0.0 versus ttype="Quote" & askprice>0.0), are different (i.e., the resulting stream messages they produce are different, and in EX. 1, a new message attribute called myvwap is computed based on the values of attributes of the incoming tuple). Also, the attribute assignments are different. This indicates that the code generator associated with Functor operator instances will generate different code for at least these two Functor operator instances.

Figure 2:
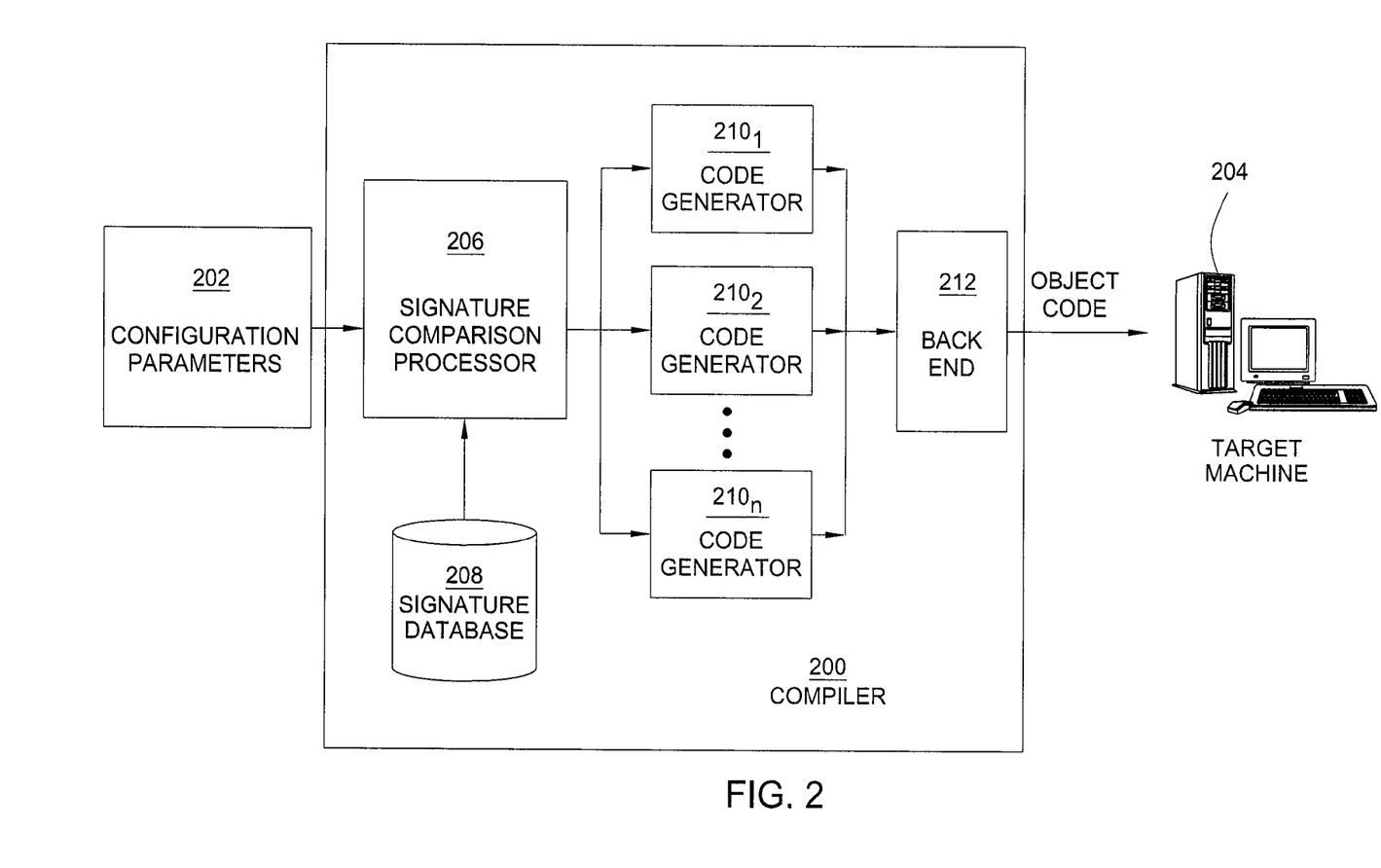
FIG. 2 is a block diagram illustrating one embodiment of a compiler, according to the present invention.

FIG. 2 is a block diagram illustrating one embodiment of a compiler 200, according to the present invention. Within the context of FIG. 2, the entity referred to as the "compiler" performs both code generation and compilation, as discussed in further detail below. The compiler 200 may be implemented, for example, to generate code for components or operator instances of a component-based application, such as the component-based application 100 illustrated in FIG. 1. As illustrated, the compiler 200 receives configuration parameters 202 for a proposed operator instance (e.g., stream schemas, filtering predicates, or the like within the context of a stream processing application) and outputs corresponding object code for the proposed operator instance to a target machine 204. The compiler 200 may be implemented in hardware, software, or a combination of both. The compiler 200 may comprise a plurality of elements, such as a signature comparator, a signature database, and a code generator. One example of a compiler 200 is the SPADE programming language compiler, as adapted according to the present invention.

As illustrated, the compiler 200 comprises a signature comparison engine 206, a repository or signature database 208, a plurality of code generators $210_1$-$210_n$ (hereinafter collectively referred to as "code generators 210"), and a back end 212. When the compiler 200 receives configuration parameters 202 for a proposed operator instance of a component-based program, it passes the configuration parameters 202 to the signature comparison processor 206. As discussed in further detail with respect to FIG. 3, the signature comparison processor 206 derives a signature for the proposed operator instance from the configuration parameters 202. The signature comparison engine 206 then compares the derived signature to a stored signature for a previously generated version of the operator instance. The stored signature is retrieved from the signature database 208.

If the signature comparison processor 206 determines, based on the signature comparison, that executable code should be generated for the proposed operator instance, the signature comparison processor 206 passes the configuration parameters 202 to the code generator 210 that corresponds to the type of operator represented by the proposed operator instance (e.g., Source, Functor, Aggregate, Join, Sink, or the like). The code generator 210 generates specialized code in a general purpose programming language for the operator instance and passes the specialized code to the back end compiler (e.g., a C or C++ programming language compiler) 212. The back end compiler 212 compiles the specialized code into object code that is executable on the target machine 204 and then and provides the object code to the target machine 204.

Figure 3:
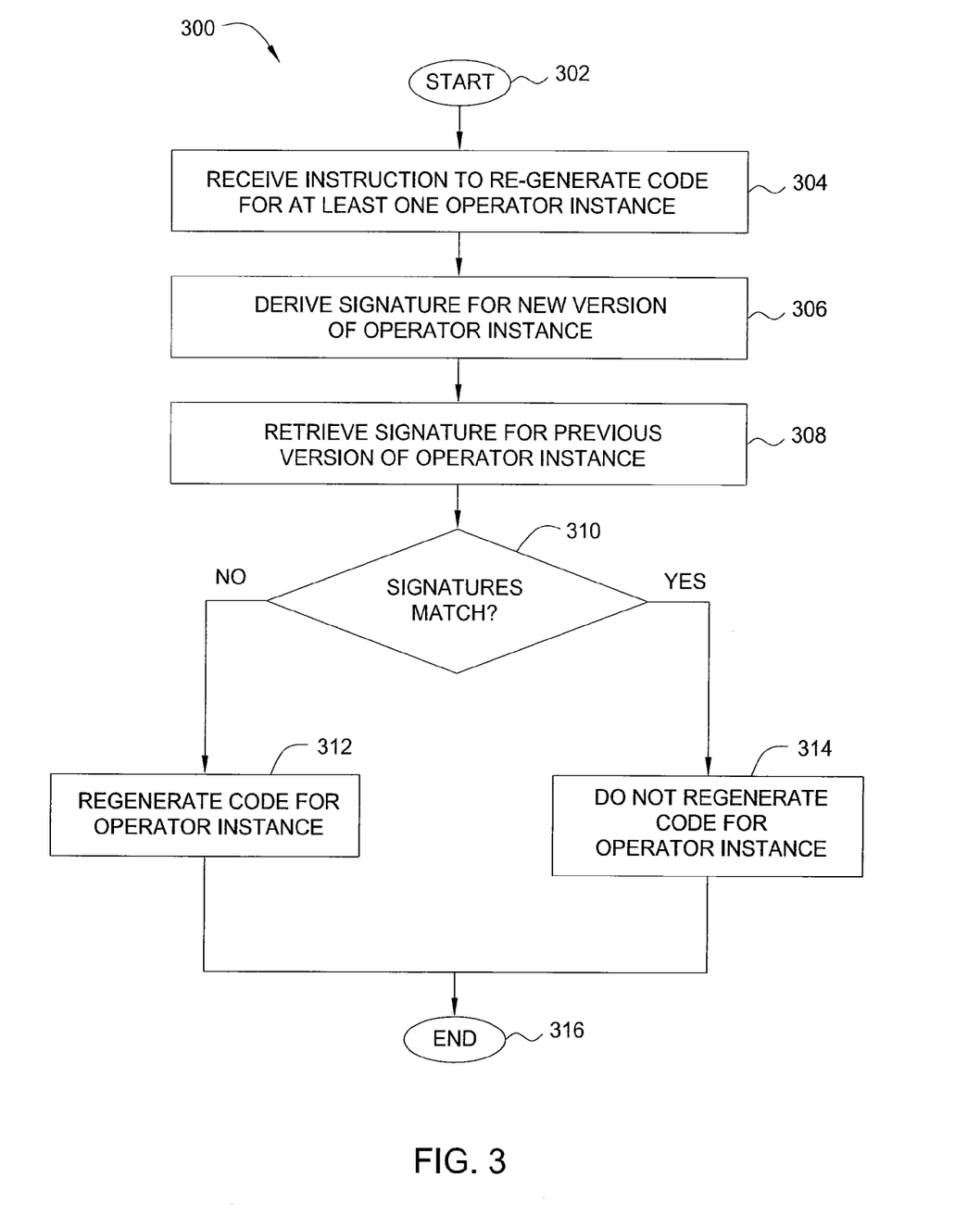
FIG. 3 is a flow diagram illustrating one embodiment of a method for generating code for a component based application, according to the present invention.

FIG. 3 is a flow diagram illustrating one embodiment of a method 300 for generating code for a component based application, according to the present invention. The method 300 may be implemented, for example, by the signature comparison processor 206 of the compiler 200 illustrated in FIG. 2. The method 300 may be implemented, for example, when a component-based application is changed and the compiler is re-run.

The method 300 is initialized at step 302 and proceeds to step 304, where the method 300 receives an instruction to re-generate the code for a component-based application. Thus, the instruction requires that code be generated for a proposed version of at least one operator instance in the application, where a current version of the operator instance is present in the current version of the application.

In step 306, the method 300 derives a signature for the proposed version of the operator instance. In one embodiment, the signature is an extensible markup language (XML) document that captures the configuration parameters of the proposed version of the operator instance. In this example, the signature represents the configuration parameters that can be used to bind the modifiable aspects of an operator to specific settings. Thus, the signature captures all of the relevant operator parameters that can trigger the generation of different code. For example, within the context of a data stream processing application, the signature for an operator instance might include the stream schema, filtering predicates, join and group-by settings, or the like. In one embodiment, the signature for an operator instance is derived from metadata associated with the operator instance. For instance, the method 300 may extract the configuration parameters from the source code for the operator instance and generate an XML- or a string-based representation of the metadata as the signature. In one embodiment, compile-time evaluatable constant expressions in the metadata are replaced with place holders (e.g., modified configuration parameters) that are loaded at runtime. This metadata captures all of the configuration parameters associated with the operator instance.

In step 308, the method 300 retrieves a signature associated with the current version of the operator instance from a code repository. In one embodiment, the code repository maintains a signature for each operator instance associated with an application, along with the generated code for the operator instance.

In step 310, the method 300 compares the signatures for the proposed operator instance and the current operator instance to determine whether the signatures match. As discussed above, the signature for an operator instance is derived from metadata that captures all of the configuration parameters associated with the operator instance. Given these configuration parameters, the code generator associated with the operator type can create the appropriate code for the operator instance. Thus, if the metadata for two operator instances is the same, then the generated code for those operator instances (as well as the signatures) are also the same. However, if the metadata for two operator instances is different, then the generated code for those operator instances (as well as the signatures) are also different. In one embodiment, the signatures are compared in full and must match down to the individual bit in order for a match to be found.

If the method 300 concludes in step 310 that the signatures for the proposed operator instance and the current operator instance do not match, then the method 300 proceeds to step 312 and re-generates the code for the operator instance (i.e., generates the code in accordance with the proposed version of the operator instance). The method 300 then stores the regenerated code and the signature (e.g., in the signature database 208 of FIG. 2) before terminating in step 316.

Alternatively if the method 300 concludes in step 310 that the signatures for the proposed operator instance and the current operator instance do match, then the method 300 proceeds to step 314 and determines that code for the operator instance does not need to be re-generated (i.e., the proposed version of the operator instance is the same as the current version of the operator instance) before terminating in step 316.

The method 300 thereby avoids the unnecessary re-generation of code for operator instances that do not change from an earlier version of an application. Operator instances that are the same should share the same code. Consider, for example, the following high-level code, which creates thirty-one instances of the program fragments described in EX. 1 and EX. 2:

```
for_begin @day 1 to day 31 # for each day
        stream TradeFilter@day (ticker: String, myvwap:Float,
        volume:Float)
            := Functor(TradeQuote@day) [ttype="Trade" & volume>0.0]
                {myvwap :=price*volume}
        stream QuoteFilter@day(ticker:String, askprice:Float, asksize:Float)
            := Functor(TradeQuote@day) [ttype="Quote" &
            askprice>0.0] { }
for_end                                                            (EX. 3)
```

In accordance with the method 300, it is advantageous to avoid re-generating code for sixty-two (i.e., thirty-one times two) operator instances in EX. 3, and instead only re-generate code for two operator instances (since the same groups of components will be reused for each of the thirty-one days).

One notable exception to the method 300 is the case in which the code generator for an operator type has changed (e.g., due to the availability of a new version of the high-level language compiler). In such a case, even if the signatures for the new version of the operator instance and the current version of the operator instance match, the code for the operator instance must still be re-generated. Changes in the code generator can be detected using file timestamps. For example, if the code generator has been modified more recently than the last-generated code, the build tools can re-generate the code without checking the signatures of the operator instances.

The signature-based technique of the method 300 can also be used to avoid unnecessary re-generation and re-compilation of code when a component-based application contains repeated operators instances. As discussed above, signatures are generated for each operator instance, and the corresponding code generator is called once for each unique signature. Thus, operator instances that share the same signature become instances of the same operator class and share the same code. Sharing code for operator instances can, in turn, significantly reduce compilation times by avoiding unnecessary code generation.

However, code sharing among operator instances can be too restrictive in some cases because full advantage cannot be taken of the similarity between operator instances. For example, consider the following code excerpt, wherein a small change in the configurations of a large number of Source operators used, in this case, to convert data coming from files into messages to be streamed out, results in excessive code generation:

```
for_begin @day 1 to day 31 # for each day
    stream TradeFilter@day (ticker: String, myvwap:Float, volume:Float)
        := Source( ) [file://taq_data_+toString(@day), binformat] { }
for_end                                                        (EX. 4)
```

Specifically, a different programming language (e.g., C or C++ programming language) implementation of the operator instance code is generated for each operator instance. For example, referring to the code excerpt of EX. 4, it is noted that each Source operator reads data from a file specified by a different uniform resource indicator (URI), which, in an implementation based on conventional techniques, would be embedded in the generated code, making the code generated for different instantiations of the operator slightly different.

Thus, embodiments of the invention further seek to avoid unnecessary code re-generation when the application contains repeated operator instances that differ only in parameter configurations that rely on constants known at compile-time. Compile-time constants in parameter configurations can be converted into arguments to be loaded by the operator instances when the operator instances are initialized at runtime. For instance, the file name in EX. 4 can be converted into an argument of the operator instance by including extra logic in the generated code to extract the file name from arguments of the operator instance. In this way, all of the Source operator instances in EX. 4 can share code, but can be fed different arguments at runtime since the operator processing logic itself remains unchanged.

In one embodiment, this code sharing technique is applied to operator parameters that are partially constant, as long as the variable (not constant) parameters match for different operator instances. In one embodiment, the compile-time constants are excluded from the operator instance's signature (discussed above), even though they are part of the operator instance's metadata, because they trigger re-compilation when a signature comparison is made as illustrated in FIG. 3.

Even when multiple operator instances are exact copies of each other, differences in the connections of the operator instances may result in changes in the generated code. For instance, the connection information may become part of the operator instance configuration. Consider, for example, the following high-level code:

```
stream TradeFilter1 (ticker: String, myvwap:Float, volume:Float)
    := Functor(QuotesA) [ttype="Trade" & volume>0.0] { }
stream TradeFilter2 (ticker: String, myvwap:Float, volume:Float)
    := Functor(QuotesA, QuotesB) [ttype="Trade" &
        volume>0.0] { }                                        (EX. 5)
```

In EX. 5, the two Functor operator instances are the same, except that the second Functor operator instance has two streams (i.e., QuotesA and QuotesB) connected to its input port, while the first Functor operator instance only has a single stream (i.e., QuotesA) connected to its input port. Similarly, it may be the case that the output streams generated by the two Functor operator instances are connected to a different number of downstream operators.

Thus, embodiments of the invention further seek to avoid unnecessary code re-generation when the application contains repeated operator instances that differ only in their interconnection patterns. In one embodiment, this is accomplished by separating the operator code from the container code. A container can host multiple operators and is responsible for establishing the connections between the operators. Similar to operator instances, container instances are also generated automatically. The mapping from the operator graph to the container graph is flexible.

Also similar to operator instances, signatures can be derived for container instances to avoid unnecessary code regeneration and re-compilation. Thus, one can minimize the re-generation and re-compilation of code by employing different instances of multi-operator hosting containers in the application. It is noted that the container code is generally not as complex as the operator code FIG. 4, for example, is a block diagram illustrating a second exemplary component-based application 400 that may be adapted to benefit from the present invention. As illustrated, the application 400 comprises a plurality of components or operator instances $402_1$-$402_n$ (hereinafter collectively referred to as "operator instances 402") interconnected by streams. As also illustrated, these operator instances 402 are hosted by container instances 404, 406, and $408_1$-$408_m$ (hereinafter collectively referred to as "container instances 408"). Each of the container instances 404, 406, and 408 hosts at least one operator instance 402.

Figure 4:
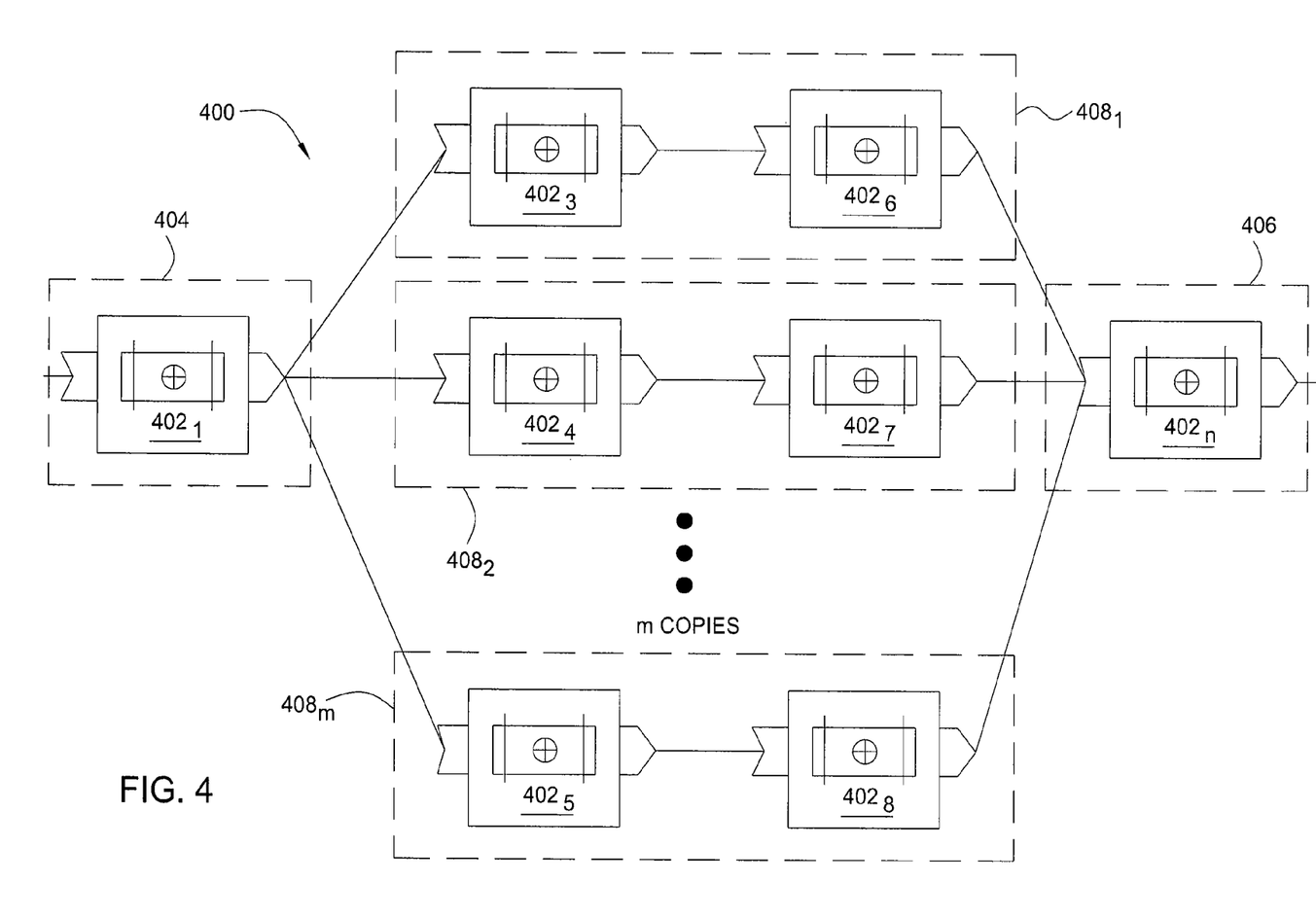
FIG. 4 is a block diagram illustrating a second exemplary component-based application that may be adapted to benefit from the present invention.

In one embodiment, all of the operator instances 402 are configured in the same way and thus share code. Moreover, as illustrated, there are m container instances 408 that are the same in terms of internal connections and operator instances 402 hosted thereby. Within the context of the exemplary application 400, one would only need to generate code for one of the container instances 408, and this code could then be shared for all m container instances 408.

Embodiments of the invention further seek to avoid unnecessary code re-generation when the application contains repeated container instances that comprise identical operator instances connected in the same manner. In one embodiment, this is accomplished in a manner similar to the solutions previously described herein. Specifically, signatures are derived for each of the container instances, where the signature for a container instance captures the intra-connection topology of the container instance as well as the signatures of the operator instances hosted thereby. In this way, container instances that have the same configuration can share code.

Figure 5:
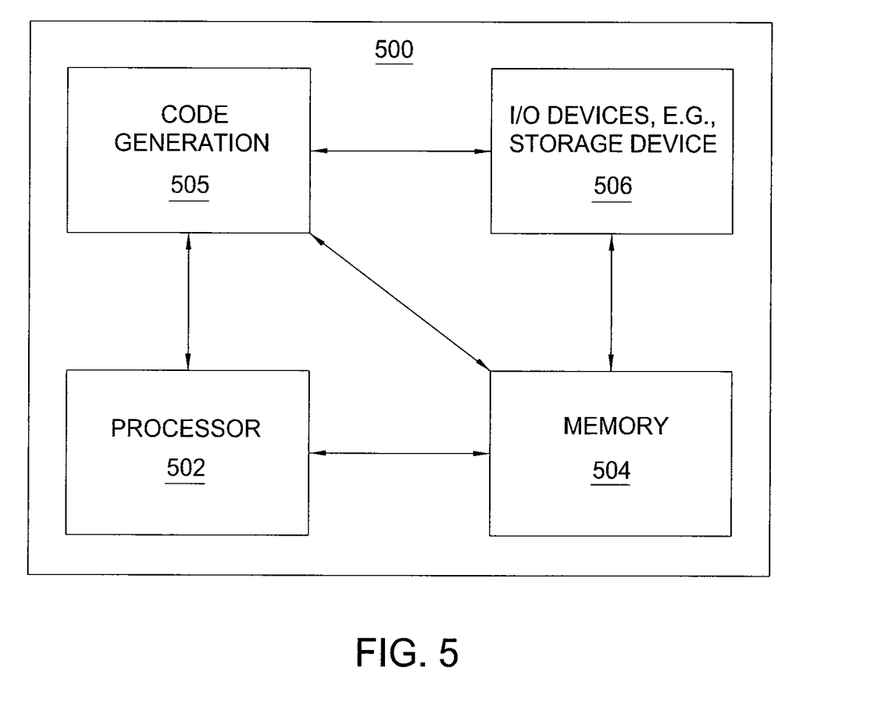
FIG. 5 is a high-level block diagram of the code generation method that is implemented using a general purpose computing device.

FIG. 5 is a high-level block diagram of the code generation method that is implemented using a general purpose computing device 500. In one embodiment, a general purpose computing device 500 comprises a processor 502, a memory 504, a code generation module 505 and various input/output (I/O) devices 506 such as a display, a keyboard, a mouse, a stylus, a wireless network access card, and the like. In one embodiment, at least one I/O device is a storage device (e.g., a disk drive, an optical disk drive, a floppy disk drive). It should be understood that the code generation module 505 can be implemented as a physical device or subsystem that is coupled to a processor through a communication channel.

Alternatively, the code generation module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the code generation module 505 for generating code for component-based applications, as described herein with reference to the preceding figures can be stored on a computer readable storage medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for constructing executable code for a new instance of an existing component-based application, the method comprising:

receiving, by a compiler executing in a computer system, a request to compile source code for the new instance of the existing component-based application, wherein the request identifies the source code, and wherein the source code comprises a plurality of source code components, each of the plurality of source code components implementing a different component of the new instance of the existing component-based application, and wherein the source code comprises a change to at least one, but less than all, of the plurality of source code components relative to a previous instance of the existing component-based application; and performing, by the compiler, a series of steps for each source code component in the plurality of source code components in the new instance of the existing component-based application, the series of steps comprising:

deriving a derived signature for the source code component, wherein the derived signature describes all configuration parameters of the source code component that are necessary for the compiler to generate the executable code for the source code component in accordance with the new instance, wherein the derived signature comprises a string-based representation of metadata that describes the configuration parameters of the source code component, wherein the configuration parameters of the source code component bind a specific setting to a modifiable aspect of an operator that operates on incoming data, wherein the modifiable aspect comprises at least one of: a stream schema of the operator, a filtering predicate of the operator, a join setting of the operator, or a, group-by setting of the operator, wherein the deriving comprises:

identifying a compile-time evaluatable constant expression in the metadata that describes the configuration parameters of the source code component; and replacing the compile-time evaluatable constant expression with a place holder in the derived signature, where the place holder is loaded at runtime;

retrieving a stored signature corresponding to a current instance of executable code for the source code component, where the stored signature describes all configuration parameters of the current instance that were necessary for the compiler to generate the executable code for the current instance;

directly comparing the derived signature with the stored signature; compiling the source code component into the executable code responsive to the derived signature not matching the stored signature, when the source code component is one of the at least one of the plurality of source code components that has changed; and obtaining the executable code for the source code component from a repository when the derived signature matches the stored signature, when the source code component is not one of the at least one of the plurality of source code components that has changed, such that source code is re-generated only for the at least one source code component that has changed when constructing the executable code for the new instance of the existing component-based application.

2. The method of claim 1, wherein the derived signature and the stored signature are both extensible markup language documents.

3. The method of claim 1, wherein the stored signature is associated in the repository with the current instance of executable code for the source code component.

4. The method of claim 3, wherein the repository maintains code and a signature for each source code component in the plurality of source code components.

5. The method of claim 1, wherein the source code component is an operator that operates on incoming data.

6. The method of claim 1, wherein the source code component is a container that hosts one or more operators that operate on incoming data.

7. An apparatus comprising a non-transitory computer readable storage medium containing an executable program for constructing executable code for a new instance of an existing component-based application, where the program performs steps of:

receiving, by a compiler executing in a computer system, a request to compile source code for the new instance of the existing component-based application, wherein the request identifies the source code, and wherein the source code comprises a plurality of source code components, each of the plurality of source code components implementing a different component of the new instance of the existing component-based application, and wherein the source code comprises a change to at least one, but less than all, of the plurality of source code components relative to a previous instance of the existing component-based application; and performing, by the compiler, a series of steps for each source code component in the plurality of source code components in the new instance of the existing component-based application, the series of steps comprising:

deriving a derived signature for the source code component, wherein the derived signature describes all configuration parameters of the source code component that are necessary for the compiler to generate the executable code for the source code component in accordance with the new instance, wherein the derived signature comprises a string-based representation of metadata that describes the configuration parameters of the source code component, wherein the configuration parameters of the source code component bind a specific setting to a modifiable aspect of an operator that operates on incoming data, wherein the modifiable aspect comprises at least one of: a stream schema of the operator, a filtering predicate of the operator, a join setting of the operator, or a ,group-by setting of the operator, wherein the deriving comprises:

identifying a compile-time evaluatable constant expression in the metadata that describes the configuration parameters of the source code component; and replacing the compile-time evaluatable constant expression with a place holder in the derived signature, where the place holder is loaded at runtime;

retrieving a stored signature corresponding to a current instance of executable code for the source code component, where the stored signature describes all configuration parameters of the current instance that were necessary for the compiler to generate the executable code for the current instance;

directly comparing the derived signature with the stored signature; compiling the source code component into the executable code responsive to the derived signature not matching the stored signature, when the source code component is one of the at least one of the plurality of source code components that has changed; and obtaining the executable code for the source code component from a repository when the derived signature matches the stored signature, when the source code component is not one of the at least one of the plurality of source code components that has changed, such that source code is re-generated only for the at least one source code component that has changed when constructing the executable code for the new instance of the existing component-based application.

8. The non-transitory computer readable storage medium of claim 7, wherein the derived signature and the stored signature are both extensible markup language documents.

9. The non-transitory computer readable storage medium of claim 7, wherein the stored signature is associated in the repository with the current instance of executable code for the source code component.

10. The non-transitory computer readable storage medium of claim 9, wherein the repository maintains code and a signature for each source code component in the plurality of source code components.

11. The non-transitory computer readable storage medium of claim 7, wherein the source code component is an operator that operates on incoming data.

12. The non-transitory computer readable storage medium of claim 7, wherein the source code component is a container that hosts one or more operators that operate on incoming data.

13. A compiler for constructing executable code for a new instance of an existing component-based application, the compiler comprising:

A memory and a processor;

an input device for receiving a request to compile source code for the component-based application, wherein the request identifies the source code, and wherein the source code comprises a plurality of source code components, each of the plurality of source code components implementing a different component of the new instance of the existing component-based application, and wherein the source code comprises a change to at least one, but less than all, of the plurality of source code components relative to a previous instance of the existing component-based application; and a plurality of elements coupled to the input device for performing a series of steps for each source code component in the plurality of source code components in the new instance of the existing component-based application, the plurality of elements comprising:

a signature comparator to derive a derived signature for the source code component, wherein the derived signature describes all configuration parameters of the source code component that are necessary for the compiler to generate the executable code for the source code component in accordance with the new instance, wherein the derived signature comprises a string-based representation of metadata that describes the configuration parameters of the source code component, wherein the configuration parameters of the source code component bind a specific setting to a modifiable aspect of an operator that operates on incoming data, wherein the modifiable aspect comprises at least one of: a stream schema of the operator, a filtering predicate of the operator, a join setting of the operator, or a group-by setting of the operator, wherein the signature comparator derives the derived signature by:

identifying a compile-time evaluatable constant expression in the metadata that describes the configuration parameters of the source code component; and replacing the compile-time evaluatable constant expression with a place holder in the derived signature, where the place holder is loaded at runtime;

a signature database to store a stored signature corresponding to a current instance of executable code for the source code component, where the stored signature describes all configuration parameters of the current instance that were necessary for the compiler to generate the executable code for the current instance; and a code generator to compile the source code component into the executable code when a direct comparison of the signature to the stored signature reveals that the signature does not match the stored signature and for obtaining the executable code for the source code component from a repository when the direct comparison reveals that the signature matches the stored signature, such that source code is re-generated only for the at least one source code component that has changed when constructing the executable code for the new instance of the existing component-based application.

14. The compiler of claim 13, wherein the code generator corresponds to a type of the source code component.

15. The compiler of claim 13, wherein the derived signature is an extensible markup language document.

16. The method of claim 1, wherein the derived signature matches the stored signature when the derived signature and the stored signature are identical down to the individual bit.

17. The method of claim 1, further comprising:

storing the executable code that is compiled when the source code component is one of the at least one of the plurality of source code components that has changed, wherein the executable code is stored in association with the derived signature.

18. The method of claim 1, further comprising:

compiling the source code component into the executable code when a code generator for a type of the source code component has changed, even when the derived signature matches the stored signature.

* * * * *